UNITED STATES PATENT OFFICE.

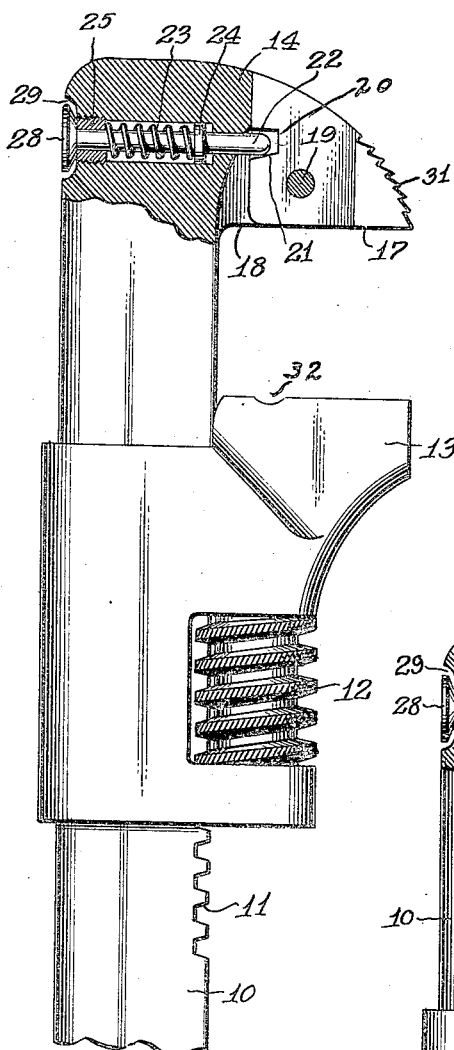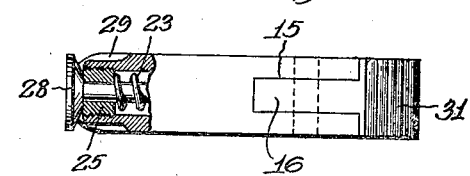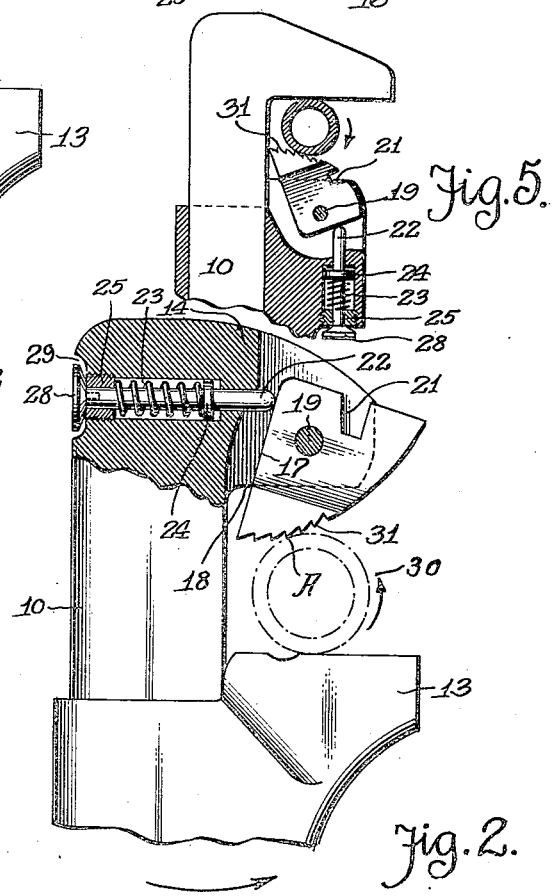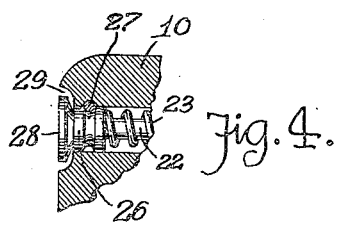

FRANK R. GILBY, OF DETROIT, MICHIGAN.

WRENCH.

1,421,936. Specification of Letters Patent. Patented July 4, 1922.

Application filed March 5, 1921. Serial No. 449,724.

*To all whom it may concern:*

Be it known that I, FRANK R. GILBY, a citizen of the United States of America, residing at Detroit, in the county of Wayne and State of Michigan, have invented certain new and useful Improvements in Wrenches, of which the following is a specification, reference being had therein to the accompanying drawings.

This invention relates to an improvement in the form of wrench commonly known as a "monkey wrench" and it has for its object the provision of a gripping dog which normally will be held in a position in which the opposed parallel faces of the fixed and movable jaws will be left smooth, but which may be moved into position to grip a cylindrical rod or a pipe when needed.

A further object of my invention is to provide a latch which will hold the gripping dog securely in inoperative position, and which will also act as a means to hold the dog resiliently in its operative position.

With the above primary and other incidental objects in view as will more fully appear in the specification, the invention consists in the features of construction, the parts and combinations thereof, and the mode of operation, or their equivalents as hereinafter described and set forth in the claims.

In the drawing,

Figure 1 is a view in elevation of a monkey wrench, the end portion being in section and the dog being in inoperative position;

Fig. 2 is a similar view showing the dog in operative position,

Fig. 3 is an end view partly in section;

Fig. 4 is a fragmentary sectional view showing a modified form of securing means for the latching device; and Fig. 5 is an elevation of a modification in which the dog is secured in the movable jaw.

In Fig. 1, the shank 10 is shown of a conventional form with the usual rack 11 engaged by the screw 12 for the purpose of adjusting the movable jaw 13 as is familiar in the art. The fixed jaw 14 is formed integral with the shank 10 and is longitudinally slotted at 15 to receive tang 16 of a pivoted dog having one edge formed with a smooth surface 17, the inner part of which, when the dog is in its inoperative position, lies flush with the inner face 18 of the jaw 14. The outer part of the dog forms an extension of the jaw. The outer face of the pivoted dog is preferably formed as the arc of a circle eccentric to the pivot 19 which passes transversely through the tang 16 and the slotted portion of the fixed jaw 14. A portion of this arcuate face is provided with serrations for a purpose which will hereinafter be described. In the edge of the tang 16 adjacent to the shank 10 is formed a notch 20, one side of which has a cam surface 21 arranged to be engaged by the end of a pin 22. The pin 22 is normally held in engagement with the tang by means of a spring 23 engaging an abutment 24, shown in the present instance as a collar, on the pin 22. The other end of the spring bears against a bushing 25 threaded into a bore in the shank 10 in the form shown in Fig. 1. An alternative arrangement is shown in Fig. 4 in which a sleeve 26 is held in the bore in the shank by a transverse pin 27. A suitable head 28 in either form may be used as a convenient means for withdrawing the pin 22 from engagement with the tang to permit pivotal movement of the dog. The shank 10 is preferably recessed at 29 so that the head 28 will not project beyond the surface of the shank 10.

It will be apparent in Fig. 1 that the arrangement of the cam surface 21 is such that the pressure upon it of the rounded end of the pin 22 will tend to rotate the pivoted dog counter-clockwise and thus act to hold the upper end of the tang closely in contact with the shank of the wrench and that in this position the lower face in Fig. 1 will be flush with the inner face 18 of the fixed jaw 14.

The operator may clasp the head 28 of the pin 22 and withdraw the pin from the notch 20. The pivoted dog will then be free to swing on the pivot 19 into the position shown in Fig. 2. When the head 28 is released, the spring 23 will thrust the end of the pin 22 against the face 17 of the tang 16, and since the axis of the pin lies above the pivot 19, in Fig. 2, the pressure of the spring will cause the pivoted dog to be held yieldably within the space between the fixed jaw 14 and the movable jaw 13. If a pipe 30 or other cylindrical object is engaged between the jaw 13 and the pivoted dog and the movable jaw is adjusted in conformity with the diameter of the pipe or other object, the serrations 31 on the arcuate face of the pivoted dog will engage the surface of the object 30 and when the shank 10 is rotated counterclockwise, as indicated by the arrow in Fig. 2 beneath the movable jaw 13, the serrations 31 will tend to imbed themselves into the surface of the object between the jaws. Any outward movement of the surface in engagement with the serrated face of the pivoted dog will, because of the eccentricity of curvature of the gripping surface result in a tightening of the grip. It will be seen that, considering the shank 10 as a lever in Fig. 2, the fulcrum will be at a point A and if the space between the jaw 13 and the serrations 31 is too great, when the object 30 slips, it will strike against the shank between the jaws.

In practice, I find that by providing a small rounded notch 32 in the face of the jaw 13, I am enabled to grasp very small rods.

While in the foregoing description the pivoted dog has been described as located in the fixed jaw 14, it is obvious that it could be placed in the movable jaw 13 as shown in Fig. 5, the operation being, of course, the same in either case.

In practice the eccentricity of the curved surface of the dog with respect to the pivot 19 may be varied within certain limits, but I have found the gripping action to be best when the center of the pivot 19 lies at a distance from the center of curvature of the curved face of the dog equal to about nine sixteenths of the radius. The distance from the center of the pivot to the gripping surface of the dog increases toward the shank, or inward of the space between the jaws, and the distance at any chosen point of the gripping surface from the pivot is greater than the distance from the pivot to a line parallel to the face of the opposing jaw, and passing through the chosen point.

From the above description, it will be apparent that there is thus provided a device of the character described possessing the particular features of advantage before enumerated as desirable, but which obviously is susceptible of modification in its form, proportion, detail construction and arrangement of parts without departure from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

I claim:—

1. A wrench having a dog pivoted thereon, a shank, and a jaw, the dog having a curved serrated surface eccentric to the pivot, the radial distance of the eccentric surface from the pivot being greatest adjacent to the shank whereby movement of the dog away from the shank causes the serrated surface to approach the jaw.

2. A wrench having opposed fixed and movable jaws, a shank, a dog having a convexly curved serrated surface pivoted upon one of the jaws, upon a pivot eccentric to the curvature of the serrated surface the radial distance of the eccentric surface from the pivot being greatest adjacent to the shank whereby pivotal movement of the dog with respect to one jaw and away from said shank will cause the serrated surface to approach the other jaw.

3. In a wrench having a fixed jaw and a movable jaw having opposed smooth faces, an adjustable dog having a smooth surface and a serrated surface and so mounted upon one of the jaws, that in one position of adjustment, the smooth surface of the dog lies substantially flush with the smooth face of the jaw, and in another position of adjustment, the serrated surface of the dog lies opposite to the smooth face of the other jaw.

4. A wrench as in claim 3, wherein a spring pressed latch is mounted in position to engage a portion of the pivoted dog to hold it at one limit of pivotal movement and to engage another portion of the dog to hold it yieldably at its opposite limit of pivotal movement.

5. A combination monkey wrench and pipe wrench having a fixed jaw and a movable jaw and a dog pivoted in one of the jaws having a straight smooth surface and a cam serrated surface, the pivotal mounting of the dog being such, that in one position of adjustment of the pivoted dog, the straight smooth surface lies partly flush with the surface of the jaw to which it is pivoted and partly forms an extension of the jaw and in another position of pivotal adjustment, the cam serrated surface of the dog lies within the space between the jaws.

6. A wrench as in claim 5, wherein the pivoted dog has a second cam surface engaged by a spring held latch, to hold it rigidly in the position of adjustment in which its straight surface is flush with the surface of the jaw.

7. A wrench as in claim 5, wherein a resiliently held member engages the smooth face of the dog to hold the serrated surface yieldingly in operative position between the jaws.

8. A wrench having opposed jaws having substantially parallel faces, a shank, and a dog mounted upon one of said jaws for gripping movement in the space between the opposed faces of said jaws, the path of movement of the dog being such, that during its gripping movement away from said shank the distance from its surface to the surface of the opposed jaw becomes less.

9. A wrench having opposed jaws with substantially parallel faces, a dog pivoted to one of the jaws and having a curved gripping face eccentric to the pivot of the dog, the portion of the gripping surface most remote from the pivot lying inward of the space between the jaws whereby outward pivotal movement of the dog will cause the distance from its gripping surface to the face of the opposed jaw to become less.

10. A wrench having opposed jaws, having substantially parallel faces, and a dog mounted upon a pivot for movement in the space between the jaws, the dog having a gripping face on the side remote from the pivot, the distance of the gripping face from the pivot increasing on one side of the perpendicular drawn from the center of the pivot to the opposed face, whereby pivotal movement of the dog in one direction will cause the gripping face to approach the opposed jaw.

In testimony whereof I affix my signature in presence of two witnesses.

FRANK R. GILBY.

Witnesses:
ANNA M. DORR,
ARTHUR MINNICK.